United States Patent [19]

Wisnouskas et al.

[11] 4,337,235
[45] Jun. 29, 1982

[54] PURIFICATION OF THIONYL CHLORIDE

[75] Inventors: Joseph S. Wisnouskas; Joseph J. Moritz, both of Grand Island, N.Y.

[73] Assignee: Hooker Chemicals & Plastics Corp., Niagara Falls, N.Y.

[21] Appl. No.: 258,498

[22] Filed: Apr. 28, 1981

[51] Int. Cl.³ .............................................. C01B 17/45
[52] U.S. Cl. ................................... 423/468; 423/469; 423/559; 423/500; 203/29; 203/51
[58] Field of Search ............... 423/468, 469, 472, 539; 203/51, 29

[56] References Cited

U.S. PATENT DOCUMENTS 2,529,671 11/1950 Bissinger ............................. 423/468
2,539,679 1/1951 Trager ................................. 423/468
3,155,457 11/1964 Kunkel ................................ 423/468
3,219,413 11/1965 Kunkel ................................ 423/469
3,592,593 7/1971 Bohm ................................. 423/472

FOREIGN PATENT DOCUMENTS 467679 8/1950 Canada ............................... 423/468
1272768 5/1972 United Kingdom ................ 423/468

Primary Examiner—Brian E. Hearn
Attorney, Agent, or Firm—Thomas T. Gordon

[57] ABSTRACT

A process for the purification of crude thionyl chloride wherein the crude thionyl chloride is distilled in the presence of sulfur and a sulfur-aluminum chloride catalyst to convert the impurities, sulfuryl chloride and sulfur dichloride and remove them from the distillate of thionyl chloride. The thionyl chloride collected will contain less than 0.01% sulfuryl chloride, less than 0.1% sulfur monochloride and less than 0.01% sulfur dichloride.

5 Claims, No Drawings

PURIFICATION OF THIONYL CHLORIDE

BACKGROUND OF THE INVENTION

Thionyl chloride ($SOCl_2$) is a valuable and useful chemical compound widely used in the preparation of chemical intermediates for pharmaceuticals, dyestuffs and other chemical areas. Purity of thionyl chloride is important as the impurities present create side reactions that complicate the chemical processes.

Thionyl chloride is prepared by the reaction of an oxy compound with sulfur chlorides or sulfur and chlorine. The impurities that are found in the manufacturing process are mainly mixtures of sulfur chlorides, e.g. sulfur monochloride and sulfur dichlorides, sulfuryl chloride, sulfur dioxide and chlorine.

Purification of thionyl chloride by distillation should be relatively easy due to the boiling point differences of the contents:

| | |
|---|---|
| Thionyl chloride | 78° C. |
| Sulfuryl chloride | 69° |
| Sulfur monochloride | 138° |
| Sulfur dichloride | 59° |
| Sulfur dioxide | −10° |
| Chlorine | −35° |

The chlorine and sulfur dioxide are easily separated, but the problem of thionyl chloride purification is compounded by the fact that the presence of sulfur chlorides present in the manufactured product cannot be separated by distillation as the higher chlorides of sulfur dissociate at distilling temperatures to form the lower chlorides, which can be grossly removed but not completely. It has been found that complete purification by distillation is very tedious, requiring many steps, i.e. removing gross amounts, followed by operation at total reflux until all the residual sulfur chlorides are decomposed to sulfur and chlorine. Decomposition of the thionyl chloride itself may occur during such a prolonged process, hampering purification and reducing the yield.

Methods of purification of impure or crude thionyl chloride have been developed wherein organic materials that will react with the sulfur chlorides, are added to the impure thionyl chloride and then separated. These methods have been unsuccessful in producing high purity material as the additives generally remain as impurities in the thionyl chloride and generally increase the organic carbon content of the product.

The addition of sulfur to the impure thionyl chloride during separation has been disclosed in Kunkel, U.S. Pat. No. 3,155,457 wherein sulfur is added to the impure material in the distillation pot as well as to the vapor stream near the top of the distillation column. This process aids in the conversion of the sulfur chlorides to the sulfur monochlorides which has the highest boiling point of the sulfur chlorides and will return to the distillation pot. This process does not remove all of the offending sulfur chlorides but does reduce their level in the collected thionyl chloride.

A method of purification disclosed in Bohm, U.S. Pat. No. 3,592,593 essentially utilizes the above purification process but adds an active iron material to the sulfur that is added to the distilling column to increase the conversion of the sulfur dichloride to sulfur monochloride.

Although both of the above processes reduce the content of the impurities in the crude thionyl chloride, neither produce very high purity thionyl chloride, as neither process specifically affects the sulfuryl chloride content. The invention disclosed herein removes the sulfuryl chloride from the distillate producing a high purity thionyl chloride with a thionyl chloride content of 99.7+%.

An object of this invention is to provide a method of purification of thionyl chloride that is continuous and efficient.

Another object of this invention is to provide a thionyl chloride purification system that will produce a water-white thionyl chloride with only trace amounts of sulfur chlorides remaining.

SUMMARY OF THE INVENTION

The purification of crude thionyl chloride in a single distillation is accomplished by the addition of sulfur-catalyst particles to the vapor flow in the upper portion of a distillation column. The sulfur-catalyst is a mixture of sulfur and aluminum chloride prepared in a moisture free atmosphere. The distillate of thionyl chloride will contain a sulfuryl chloride content of less than 0.01%, a sulfur monochloride concentration of less than 0.1% and a sulfur dichloride content of less than 0.01%.

DETAILED DESCRIPTION OF THE INVENTION

Thionyl chloride is produced by the reaction of sulfur chlorides with an oxy compound, such as sulfur trioxide, and the product that results from this reaction contains thionyl chloride in various strengths with sulfuryl chloride, sulfur monochloride, and sulfur dichloride as the principle contaminants. Depending upon the process of manufacture used the concentration thionyl chloride obtained is in a range of about 70 to 85%. This product shall be termed crude thionyl chloride.

A typical crude thionyl chloride contains the following:

| | | |
|---|---|---|
| Sulfuryl chloride | ($SO_2Cl_2$) | 0.31% |
| Sulfur dioxide | ($SO_2$) | 0.15% |
| Sulfur monochloride | ($S_2Cl_2$) | 6.96% |
| Sulfur dichloride | ($SCl_2$) | 12.45% |
| Thionyl chloride | ($SOCl_2$) | 80.13% |

Separation of the thionyl chloride by distillation is difficult due to the unfavorable relative volatilities of sulfur dichloride and sulfuryl chloride would require an excessive reflux ratio and excessive number of distillation plates for moderate high purity thionyl recoveries. The fact that decomposition occurs at elevated (distillation) temperatures makes this system more complicated.

The following equilibrium reaction can occur during distillation of thionyl chloride:

$$S_2Cl_2 \rightleftharpoons S + SCl_2$$

$$S_2Cl_2 + Cl_2 \rightleftharpoons 2SCl_2$$

$$2SOCl_2 \rightleftharpoons SO_2 + Cl_2 + SCl_2$$

$$SO_2Cl_2 \rightleftharpoons SO_2 + Cl_2$$

The addition of elemental sulfur to the column lessens the deleterious effects of decomposition by converting low boiling impurities as follows:

$$SCl_2 + S \rightleftharpoons S_2Cl_2$$

But sulfur can act to destroy the desired product as follows:

$$2SOCl_2 + 3S \rightleftharpoons SO_2 + 2S_2Cl_2$$

The process of this invention employs the use of aluminum chloride with sulfur added to the vapor stream of the fractionator to remove the sulfuryl chloride from the stream.

The presence of aluminum chloride will enhance the reaction of sulfur dichloride with sulfur and destroy sulfuryl chloride as follows:

$$SO_2Cl_2 + 2S \xrightarrow{AlCl_3} S_2Cl_2 + SO_2$$

and/or $$SO_2Cl_2 + AlCl_3 \rightleftharpoons AlCl_3 + SO_2 + Cl_2$$

The sulfur-catalyst, or sulfur-aluminum chloride mixture that is added to the top of the distillation column is prepared by dispersing uniformly in molten sulfur the desired amount of aluminum chloride. The molten mass is allowed to cool and crushed to a convenient size for addition to the reflux column. The melting, dispersion, cooling, crushing and storage should be conducted in a dry atmosphere to reduce the moisture content. The concentration of catalyst (aluminum chloride) in the sulfur can be varied from 0.1 to 3%. The percentage of aluminum chloride used will be dependent upon several factors including the sulfuryl content of the crude thionyl chloride feed stock, as well as the design of the sulfur-aluminum chloride section in the distillation column, the design of the column to mention but a few variables in the operation of the process. A specific example of sulfur-catalyst preparation will be given in Example I.

The sulfur-catalyst particles are added to the upper portion of the distilling column allowing the particles to rest upon the uppermost plate of the column or to provide a basket, chamber or other device to be placed in the column vapors near the take off point allowing for the hot vapors and reflux liquids to contact the sulfur-catalyst mixture.

It is believed that the sulfur present in the distillation pot assists in the conversion of sulfur dichloride to the sulfur monochloride, and the sulfur-aluminum chloride placed in the vapor stream assists in the conversion of the sulfuryl chloride to sulfur monochloride, and/or sulfur dioxide and chlorine. As shown in the above equations, the equilibrium reactions through the addition of sulfur and the sulfur aluminum chloride catalyst, will be forced toward the formation of sulfur monochloride condition. The boiling point of the sulfur monochloride having the highest boiling point of the sulfur chlorides will remain in the distillation pot and will not be distilled. The temperature of the distillation is controlled at a temperature below 138° C., the boiling point of the sulfur monochloride. Temperatures will be controlled within the range below the boiling point of the sulfur monochloride and above the boiling point of thionyl chloride (78° C.).

The operation of the process is briefly described as follows, the crude thionyl chloride is placed in the distillation pot or reboiler with some sulfur, and placed over the reboiler is a distillation column such as an Oldershaw column and at the top of the column is a port for adding the sulfur-catalyst pellets plus a condenser for removing the thionyl chloride. Heat is applied to the reboiler and the process is begun. A clear distillate is obtained which contains very low content of sulfur chlorides.

Typical distillates will contain the sulfur-chlorides in trace amounts within the following ranges:

| | |
|---|---|
| Sulfuryl chloride | 0.005–0.009% |
| Sulfur monochloride | 0.07–0.12% |
| Sulfur dichloride | 0.000–0.008% |

Sulfur dichloride in thionyl chloride is readily detected due to its color, but the amount found in the thionyl chloride distillate (0.00–0.008%) is not sufficient to impart any color to the distillate.

In the continuous operation of this process, additional crude thionyl chloride is added to the reboiler pot, while additional sulfur-aluminum chloride is added to the upper section of the column.

The invention is further illustrated by the following examples without being restricted thereby.

EXAMPLE I

PREPARATION OF SULFUR-CATALYST

The sulfur-catalyst mixture is prepared by melting 400 grams of sulfur and stirring into the molten mass 8.0 grams of aluminum chloride. The mixing operation is conducted under a nitrogen atmosphere to reduce the moisture. After through mixing, the mass is allowed to cool and solidify. The cooling solidification step is also conducted under a nitrogen atmosphere. The mass is crushed into smaller pieces of a size that will allow easy entry into the port of the distilling column. Storage of the sulfur-aluminum chloride mixture is under a nitrogen blanket to prevent moisture from entering the mixture.

EXAMPLE II

PURIFICATION OF THIONYL CHLORIDE

The equipment consists of a 500 ml three necked flask with heating mantle, agitator and attached to the center opening of the flask is a ten plate Oldershaw column with a reflux splitter and condenser attached.

600 grams of crude thionyl chloride was added to the flask. This crude thionyl chloride contained 13.80 to 16.87% sulfur chlorides ($S_2Cl_2$ and $SCl_2$) and 0.09% sulfuryl chloride. 30 grams of sulfur was added to the flask and 124.8 grams of the 2% $AlCl_3$-sulfur catalyst prepared according to Example I was added to the top of the distillation column, as needed. No mechanical reflux was employed but internal reflux was observed due to column cooling. 282 grams of distillate was collected. The results are tabulated in Table I.

Examples III and IV are included to demonstrate the comparison between the process of this invention (Example II) and the prior art processes of Kunkel (U.S. Pat. No. 3,155,457) and of Bohm (U.S. Pat. No. 3,592,593).

EXAMPLE III

KUNKEL PROCESS

The equipment used was identical to that described in Example II. 600 grams of crude thionyl chloride, having the same composition as that used in Example II was added to the flask. 30 grams of sulfur was added to the flask and 63 grams to the top of the distillation columns as needed. No mechanical reflux was employed, but internal reflux was observed due to column cooling. 229 grams of distillate was collected. The results are tabulated in Table I.

EXAMPLE IV

BOHM PROCESS

The same equipment, feed and operating conditions as described in Examples II and III were employed. 116 grams of a sulfur-FeCl₃ mixture were added to the top of the column. 240 grams of distillate were collected using no mechanical reflux. The results are tabulated in Table I.

TABLE I

|  | Crude Thionyl Chloride Feedstock | Example II | Example III | Example IV |
|---|---|---|---|---|
| $SO_2Cl_2$ | 0.09% | 0.03% | 0.07% | 0.07% |
| $S_2Cl_2$ | 13.80 to 16.87% | 0.07% | 0.02% | 0.09% |
| $SCl_2$ |  | <0.01% | 0.83% | 0.01% |
| $SOCl_2$ | 82.9 to 86.1% | 99.7% | 99.0% | 99.6% |

All of the above percentages are weight percents.
In each experiment the first distillate cut was excluded.

EXAMPLE V

BATCH PILOT PLANT

A batch type pilot reactor, of 50 gallon capacity, was charged with 425 pounds of crude thionyl chloride. 21 pounds of sulfur was added to the pot. A 4 inch diameter distillation column 12 feet in length was connected to the reactor and the column contained ½ inch ceramic Intalox saddles. To the top of the distillation column was added 40 pounds of sulfur-AlCl₃ catalyst (0.1% AlCl₃). Reflux was controlled at 1:1 to produce a product with the following composition:

|  | Crude Feed | Product |
|---|---|---|
| $SO_2Cl_2$ | 0.28% | ≦0.01% |
| $S_2Cl_2$ | 23.30% | 0.1% |
| $SCl_2$ |  | <0.01% |

All percentages are weight percents.

EXAMPLE VI

CONTINUOUS PILOT PLANT

The equipment consists of a 50 gallon capacity pot, reflux splitter condenser and a 4 inch diameter by 12 feet in length column packed with ½ inch ceramic Intalox saddles. The AlCl₃-sulfur catalyst (1% AlCl₃) was added to a chamber at the top of the column automatically every 10 to 15 minutes through a valving system and level sensor. The column was operated in a continuous mode by constantly feeding crude thionyl chloride to the reboiler pot to control the temperature at 120° C. while collecting the product. The residue in the reboiler pot was withdrawn at intervals to keep the pot level between ½ and ¾ full. During the run 2163 pounds of crude thionyl chloride and 90 pounds of AlCl₃-sulfur catalyst were added continuously while 1504 pounds of water-white low sulfuryl chloride product was collected. 600 pounds of residue and 113 pounds of gas were withdrawn. The composition of feedstock, product, residue and the influence of the catalyst bed and catalyst containing reflux can be seen in Table II.

TABLE II

|  | $SO_2Cl_2$ | $SO_2$ | $S_2Cl_2$ | $SCl_2$ | $SOCl_2$ |
|---|---|---|---|---|---|
| Feedstock | .116% | .17% | 11.45% | 7.39% | 76.25% |
| Vapor Sample before Sulfur Bed | .037% | 2.43% | .115% | .087% | 97.33% |
| Distillate Product | .009% | .139% | .089% | .002% | 99.76% |
| Residue | 0.002% | 0.275% | 79.3% | 7.7% | 12.70% |

All percentages are weight percents.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

We claim:

1. A process for the recovery of thionyl chloride from its admixture with impurities including sulfuryl chloride, sulfur monochloride and sulfur dichloride, said process comprising fractionally distilling said mixture in the presence of sulfur so that a mixture of thionyl chloride, sulfuryl chloride, sulfur dichloride and sulfur is distilled, said distillate in a vapor state passing through a bed of sulfur-aluminum chloride particles and reflux vapors containing sulfur-aluminum chloride to convert the sulfuryl chloride to sulfur dioxide, chlorine and sulfur monochloride, and sulfur dichloride to sulfur monochloride, conducting the sulfur monochloride to said mixture being distilled, taking off the purified distilled thionyl chloride, substantially free of sulfuryl chloride, sulfur dichloride and sulfur monochloride.

2. A process according to claim 1 wherein the sulfur in the distilling mixture is added to the distilling liquid prior to its distillation.

3. A process according to claim 1 wherein the temperature of the distillation is below the boiling point of sulfur monochloride and above the boiling point of thionyl chloride.

4. A process according to claim 1 wherein the sulfur-aluminum chloride catalyst is composed of from about 0.1 to about 3.0 percent aluminum chloride.

5. A process according to claim 4 wherein the sulfur-aluminum chloride catalyst is about 1% aluminum chloride.

* * * * *